(12) United States Patent
Fernandez et al.

(10) Patent No.: US 9,082,087 B2
(45) Date of Patent: Jul. 14, 2015

(54) SYSTEM AND METHOD FOR GENERATING A CUSTOM REVENUE CYCLE MODEL WITH AUTOMATED LEAD MOVEMENT

(75) Inventors: Phillip M. Fernandez, Palo Alto, CA (US); Jonathan Miller, Burlingame, CA (US); Robert Carp, Danville, CA (US)

(73) Assignee: Marketo, Inc., San Mateo, CA (US)

( * ) Notice: Subject to any disclaimer, the term of this patent is extended or adjusted under 35 U.S.C. 154(b) by 82 days.

(21) Appl. No.: 13/204,647

(22) Filed: Aug. 6, 2011

(65) Prior Publication Data
US 2013/0035977 A1 Feb. 7, 2013

(51) Int. Cl.
*G06Q 30/00* (2012.01)
*G06Q 10/00* (2012.01)

(52) U.S. Cl.
CPC .................... *G06Q 10/00* (2013.01)

(58) Field of Classification Search
CPC .................................. G06Q 30/0202
USPC ............................... 705/7.11–7.42
See application file for complete search history.

(56) References Cited

U.S. PATENT DOCUMENTS

| | | | | |
|---|---|---|---|---|
| 2008/0162487 | A1* | 7/2008 | Richter | 707/10 |
| 2010/0023370 | A1* | 1/2010 | Tivey et al. | 705/9 |
| 2010/0121684 | A1* | 5/2010 | Morio et al. | 705/10 |
| 2010/0257012 | A1* | 10/2010 | Walker et al. | 705/9 |
| 2011/0225047 | A1* | 9/2011 | Breed et al. | 705/14.55 |
| 2011/0246260 | A1* | 10/2011 | Gilbert et al. | 705/7.32 |
| 2011/0251874 | A1* | 10/2011 | Banthia et al. | 705/7.31 |
| 2011/0258016 | A1* | 10/2011 | Barak et al. | 705/7.29 |
| 2011/0264479 | A1* | 10/2011 | Birr | 705/7.13 |
| 2011/0264486 | A1* | 10/2011 | Johnson et al. | 705/7.36 |
| 2011/0288962 | A1* | 11/2011 | Rankin et al. | 705/27.1 |

OTHER PUBLICATIONS

"Best Practices in Lead Nurturing" (2008) Marketo (http://docs.cdn.marketo.com/best-practices-for-lead-nurturing-wdfm.pdf).*
"The Definitive Guide to Lead Nurturing—A Marketo Workbook" (2009) Marketo (http://docs.cdn.marketo.com/definitive-guide-to-lead-nurturing.pdf).*

* cited by examiner

Primary Examiner — Sujay Koneru
(74) Attorney, Agent, or Firm — Martine Penilla Group, LLP (57) ABSTRACT

A system and method for generating a custom revenue cycle model with automated lead movement are disclosed. According to one embodiment, a computer-implemented method comprises receiving user input, wherein the user input comprises at least one of data related to a stage, data related to a success path definition, and data related to transition rules for lead movement, wherein the stage is a revenue stage or a detour stage; generating a custom revenue cycle model based on the user input; storing the custom revenue cycle model; providing for automated lead movements based on the transition rules; and providing for automated tracking of lead movements in the custom revenue cycle model.

18 Claims, 13 Drawing Sheets

| Last | First | Job Title | Company | Email | Status | Score |
|---|---|---|---|---|---|---|
| Unknown | Shel | VP, Marketing | Pap Systems | | | 40 |
| Abreau | Adalis | Group Account Direct | Psoft Services | aabreau7@demo.marketo.ne | Inquiry | -2 |
| Adamec | Anita | Other | Gwant Systems | aadamec0@demo.marketo.n | Inquiry | 18 |
| Aguas | Alex | Manager | Byphon Company | aaguas@demo.marketo.net | Ex-Pending | 10 |

Page 1 of 85    Quick Find    0 selected    1-50 of 4,244

| Stage | To Stage | Flow | Conversion Ratio (All Types) | Avg Transition Time (days) |
|---|---|---|---|---|
| | Known | 1 | 0.01% | 47 |
| | Engaged | 266 | 1.95% | 0 |
| | Prospect | 1360 | 9.96% | 76 |
| | Lead | 5702 | 41.74% | 71 |
| | Sales Lead | 381 | 2.79% | 47 |
| | Sales Accepted Opportunity | 349 | 2.55% | 77 |
| | Pipeline | 390 | 2.86% | 87 |
| | Customer | 1211 | 8.87% | 92 |
| | Partners | 373 | 2.73% | 53 |
| Prospect | Inquiry | 1750 | 12.81% | 82 |
| | Inactive | 7013 | 51.34% | 144 |
| | Disqual/Dead | 653 | 4.78% | 87 |
| | Re-Engaged | 1846 | 13.51% | 189 |
| | Recycled | 3888 | 28.46% | 94 |
| | Sales Developing | 327 | 2.39% | 96 |
| | Lost/Deferred | 1056 | 7.73% | 133 |
| | Account has Deal, Not Associated to Oppor | 2734 | 20.01% | 86 |
| | Ex-Customer | 19 | 0.14% | 134 |

SYSTEM AND METHOD FOR GENERATING A CUSTOM REVENUE CYCLE MODEL WITH AUTOMATED LEAD MOVEMENT

FIELD

The field of the invention relates generally to computer systems. In particular, the present invention is directed to a system and method for generating a custom revenue cycle model with automated lead movement.

BACKGROUND

A "lead" is a person or company, who may have interests in a firm's products or services. Marketing departments receive new leads through website visits, online or traditional advertisers, webinars, and other marketing campaigns. Millions of leads may be generated through different marketing channels.

Management of the large quantity of leads includes tracking leads, identifying high-quality leads to pass on to a sales department, identifying potential customers to nurture, as examples. Management of leads may be extremely time-consuming and difficult due to the sheer volume of the leads, the subjective way that people value each lead, and the fact that only a small number of the leads represent people or companies with a genuine intent to purchase. Furthermore, the lifecycle of a successful lead that generates a sale and, ultimately, revenue spans across both the marketing and sales departments. As a result, efficient management of leads over the lifecycle is also important to the sales department.

A lead management system today helps marketers manage a large quantity of leads. Existing systems embrace the concept of marketing and sales cycles by allowing a user to assign leads to predefined statuses. Some existing systems also allow the definition of rules that move leads from one status to another without human intervention upon fulfillment of certain conditions.

A lead goes through a sequence of stages before resulting in a purchase. From a firm's perspective, a lead first makes itself known to the firm (referred to herein as the known stage). Marketing staff may send emails, make phone calls, invite leads to webinars or road shows, and conduct other various marketing activities to engage and nurture the lead to a point where it is ready to make a purchase within a short period of time. The lead is then transitioned to the sales department (referred to herein as the sales accepted lead stage). Sales representatives contact the lead to determine whether there is a genuine intent to purchase. If so, the lead is transitioned to a sales accepted opportunity stage. When a purchase or sale is completed, the lead transitions to a customer stage.

The sequence of stages that leads go through forms the revenue cycle of a firm. Marketing and sales departments segment leads based on stages in the revenue cycle, so that leads in different stages are able to receive different levels of attention and treatment. The revenue cycle concept grows out of sales cycle and marketing cycle concepts, and is adopted by firms that seek to streamline activities and management in marketing and sales departments for superior revenue generations. Existing types of revenue cycle concepts in marketing/sales practices simply combine the marketing and sales cycles. As a result, they are visualized as a funnel of stages.

Figure 1:
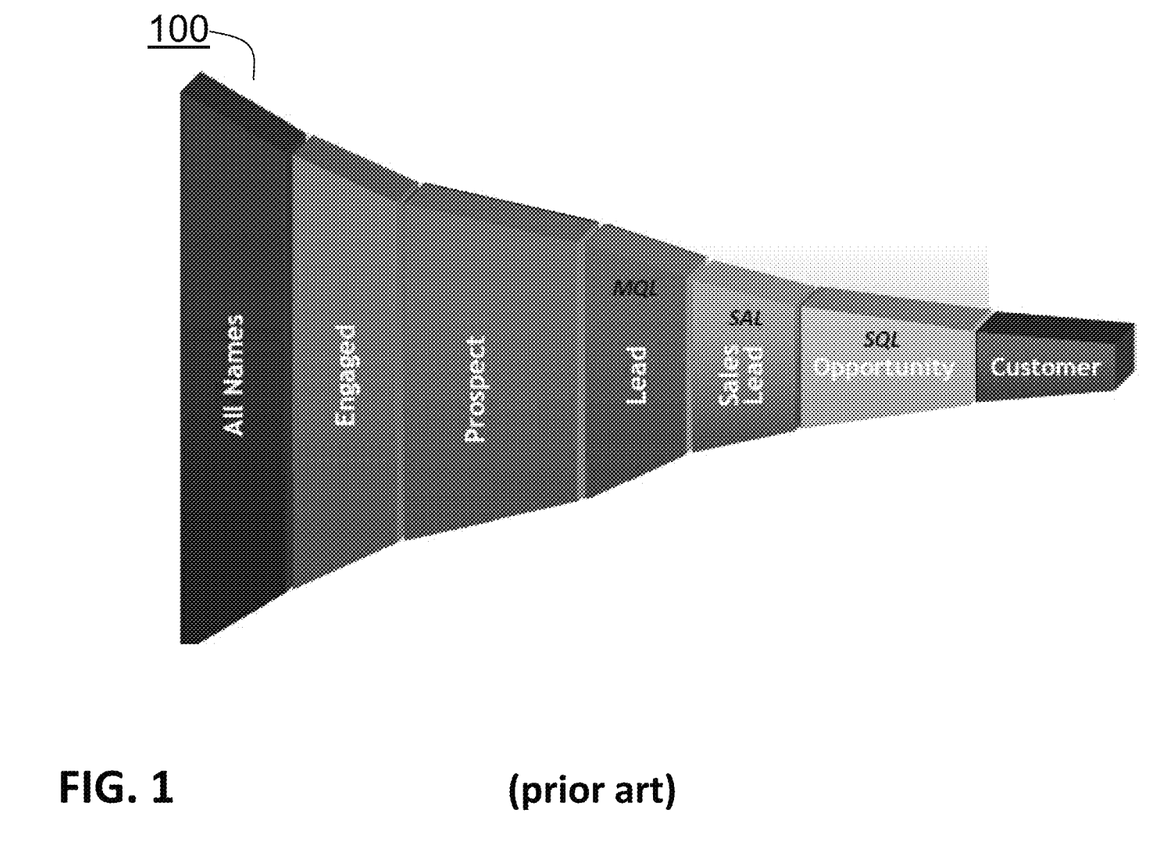
FIG. 1 illustrates a prior art sequence of lead stages represented as a funnel.

FIG. 1 illustrates a prior art sequence of lead stages represented as a funnel. The funnel 100 illustrates that fewer and fewer leads are able to progress to the later stages.

SUMMARY

A system and method for generating a custom revenue cycle model with automated lead movement are disclosed.

According to one embodiment, a computer-implemented method comprises receiving user input, wherein the user input comprises at least one of data related to a stage, data related to a success path definition, and data related to transition rules for lead movement, wherein the stage is a revenue stage or a detour stage; generating a custom revenue cycle model based on the user input; storing the custom revenue cycle model; providing for automated lead movements based on the transition rules; and providing for automated tracking of lead movements in the custom revenue cycle model.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION

The accompanying drawings, which are included as part of the present specification, illustrate the presently preferred embodiment and, together with the general description given above and the detailed description of the preferred embodiment given below, serve to explain and teach the principles of the present invention.

FIG. 6 illustrates an exemplary lead view interface for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The

DETAILED DESCRIPTION

A system and method for generating a custom revenue cycle model with automated lead movement are disclosed. According to one embodiment, a computer-implemented method comprises receiving user input, wherein the user input comprises at least one of data related to a stage, data related to a success path definition, and data related to transition rules for lead movement, wherein the stage is a revenue stage or a detour stage; generating a custom revenue cycle model based on the user input; storing the custom revenue cycle model; providing for automated lead movements based on the transition rules; and providing for automated tracking of lead movements in the custom revenue cycle model.

The sequence of steps illustrated in FIG. 1 is inadequate as some leads are better assigned to stages not in the funnel as defined above. For example, if a company is deemed too small now to buy the firm's product, it makes sense not to remove the lead from the system, but to move it to a recycling stage so that it can be later re-engaged. Such stages are referred to herein as "detour stages." It should be appreciated that there are many different detour stages other than recycling and re-engaged stages. Given the definition of detour stages, the desired set of stages that a lead traverses in order to move from anonymity to generating revenue are referred to herein as "success path" stages. The pathway for a lead to go from anonymous to a closed win stage without going through any detour stages is called success path.

According to one embodiment, the present system enables custom-defined models. Firms are able to define and customize one or more revenue cycle models based on their own business practice. As a result, different customers can define different stages and transition rules on the success path.

According to one embodiment, the present system supports revenue cycle models with detour stages. As a result, different customers can define different detour stages and transition rules among success path stages and detour stages.

According to one embodiment, a revenue cycle model has one or more than one success paths. For example, one of the paths is designated to new sales, while a different success path is used for upsell/cross-sell.

According to one embodiment, the present system supports automated lead movement through a revenue cycle engine that interprets revenue cycle models and moves leads among different stages based on rules defined in the custom models.

According to one embodiment, the present system supports manual override of stage transitions for individual leads or set of leads.

According to one embodiment, the present system supports automated tracking and monitoring of lead movement. The present system connects revenue cycle models with a lead database through the revenue cycle engine. Lead related information (demographic and behavior) as well as marketing activities related to the leads are tracked and recorded by the lead database.

According to one embodiment, the present system supports revenue cycle stage types. Each type of revenue stage comes with specific business semantics, different metrics, and different ways to measure success. For example, the present system supports three types of stages: inventory, SLA, and gate. An inventory stage is a holding pool where leads can sit for an unlimited amount of time until they are ready to move to another stage. For example the prospect stage is where leads who have the potential to buy the products/services are kept and nurtured (through email campaigns, webinar invitations, etc.) until they are sales ready. SLA stands for service level agreement. SLA stages denote a defined time period (for example 7 days) during which a lead must be reviewed before moving forward or be eliminated from the process. The present system sends reminders to lead owners to perform such reviews in time.

A gate stage is a stage where incoming leads are immediately routed to other stages based on its attributes. For example, if a company is only interested in leads from a given industry, a gate stage could be created to move those leads from the industry to the next success path stage, and move the rest to a disqualified stage.

According to one embodiment, the present system supports revenue cycle phases. Revenue stages on a success path are further grouped into predefined phases, examples include pre marketing qualified, marketing qualified, sales accepted, sales qualified, and closed/won. This unifies custom-defined models so that tracking, monitoring, and analyzing of leads, lead movement, marketing activities, and sales results are conducted across different customers. Detour stages can also be assigned to phases.

According to one embodiment, the present system supports custom-defined rules to place new leads into the lead management system at different stages based on lead sources and attributes. For example, inbound leads - - - those who have left the company a message to call back - - - can move directly to marketing accepted lead stage without going through earlier stages on the success path.

According to one embodiment, the present system supports validation of a custom-defined revenue cycle model. The custom-defined revenue cycle model is validated by the system before it is approved and becomes active. Validation includes but is not limited to checking that there is a complete success path, transitions have complete filter definitions, and gate stages have at least two outbound transitions to other stages, besides the logic applied to stage transitions. For example, one type of validation is to ensure that transition rules for moving lead out of a stage (for example A) to a number of stages (for example, B and C) are mutually exclusive. That is, there cannot be two rules that require "if a lead in stage A visited the web site more than 10 times in the last week, move the lead to B", and "if a lead in stage A visited the web site more than 10 times in the last week, move the lead to C".

According to one embodiment, a revenue cycle modeler of the present system improves upon manual judgment by enabling a rules-based, real-time transition between stages based on behavioral indicators. These indicators can be both positive (e.g. along the success path) and negative (e.g. to recycling, or to lost), and improve the quality of a sales pipeline because the leads and prospects determine their movement through the pipeline based on behaviors and buying signals, rather than from a judgment call.

The present system eliminates issues related to ignoring stale leads or lost deals in the pipeline. It is common prior art practice to delete a prospect rather than entering a reason for losing a sale, and the present action-based model better represents the timing of transitions and the reason for those transitions.

According to one embodiment, the present system includes a lead database containing demographic information and behavioral activities for leads. The lead database enables the user to select and segment groups of prospects based on characteristics or activities. An analytics module enables the user to report against these same characteristics or activities.

According to one embodiment, behavioral tracking of the present system depends on a set of back-end servers that process marketing campaign and user activities such as email activities (sends, bounces, opens) and web activities (page visits, clicks, and form fill-outs). This behavioral information can drive a model to move prospects through the sales cycle, and forms the basis of stage changes within the model.

Figure 2:
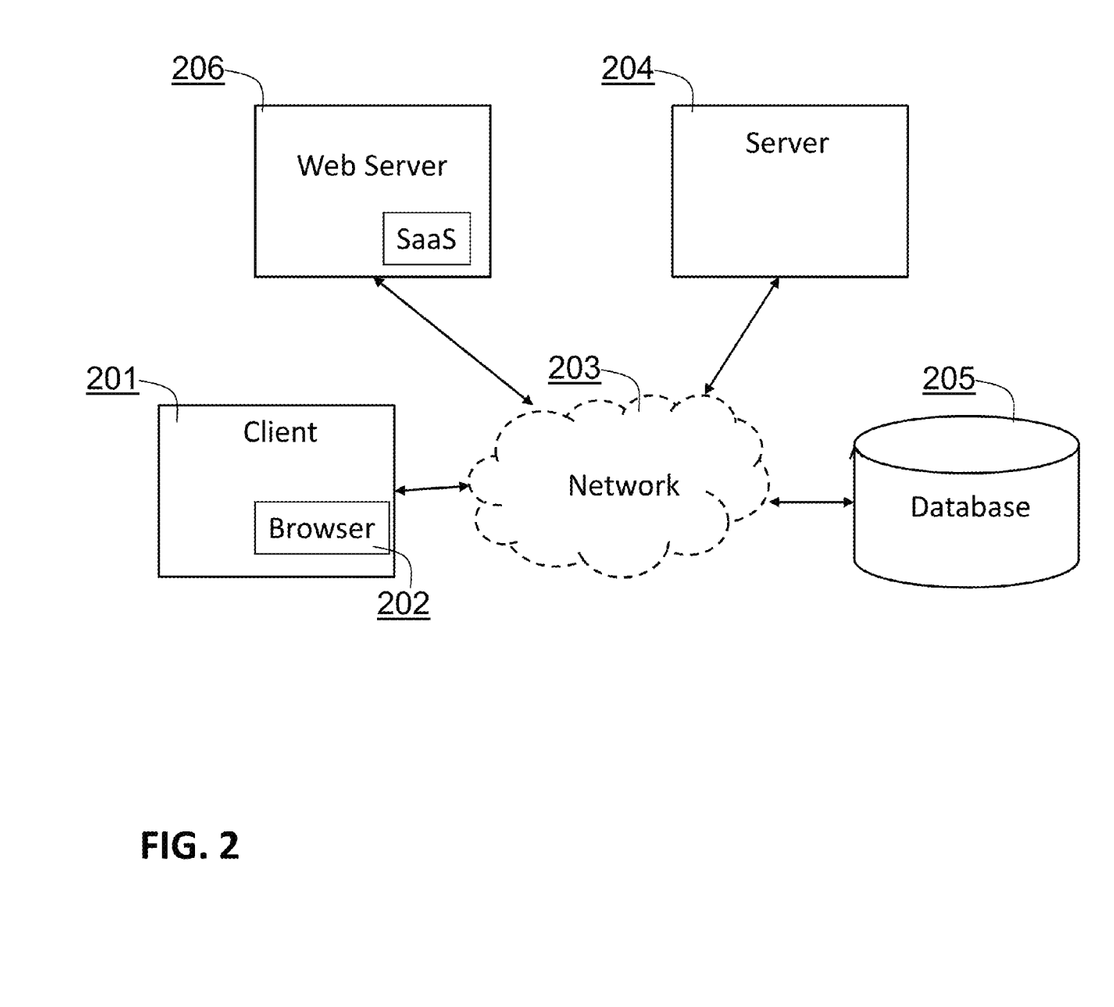
FIG. 2 illustrates an exemplary system layout for use with the present system, according to one embodiment.

FIG. 2 illustrates an exemplary system layout for use with the present system, according to one embodiment. According to one embodiment, the present system leverages an email delivery and tracking system, a web hosting and tracking system, and a customer database that provides a comprehensive view of both demographic and behavioral information for prospects. A client system 201 having a browser 202 is in communication over a network 203. The client system 201 accesses the present system available through a web server 206 over the network 203. A server 204 and database 205 are also in communication with the network 203. It should be appreciated that the web server 206, server 204, and database 205 can all reside on the same system in other embodiments. It should also be appreciated that the client system 201 can be any mobile or computing device configured to access the present system as described herein. An exemplary computer architecture used by the client system 201, web server 206, server 204, and database 205 is described below with reference to FIG. 11.

Figure 3:
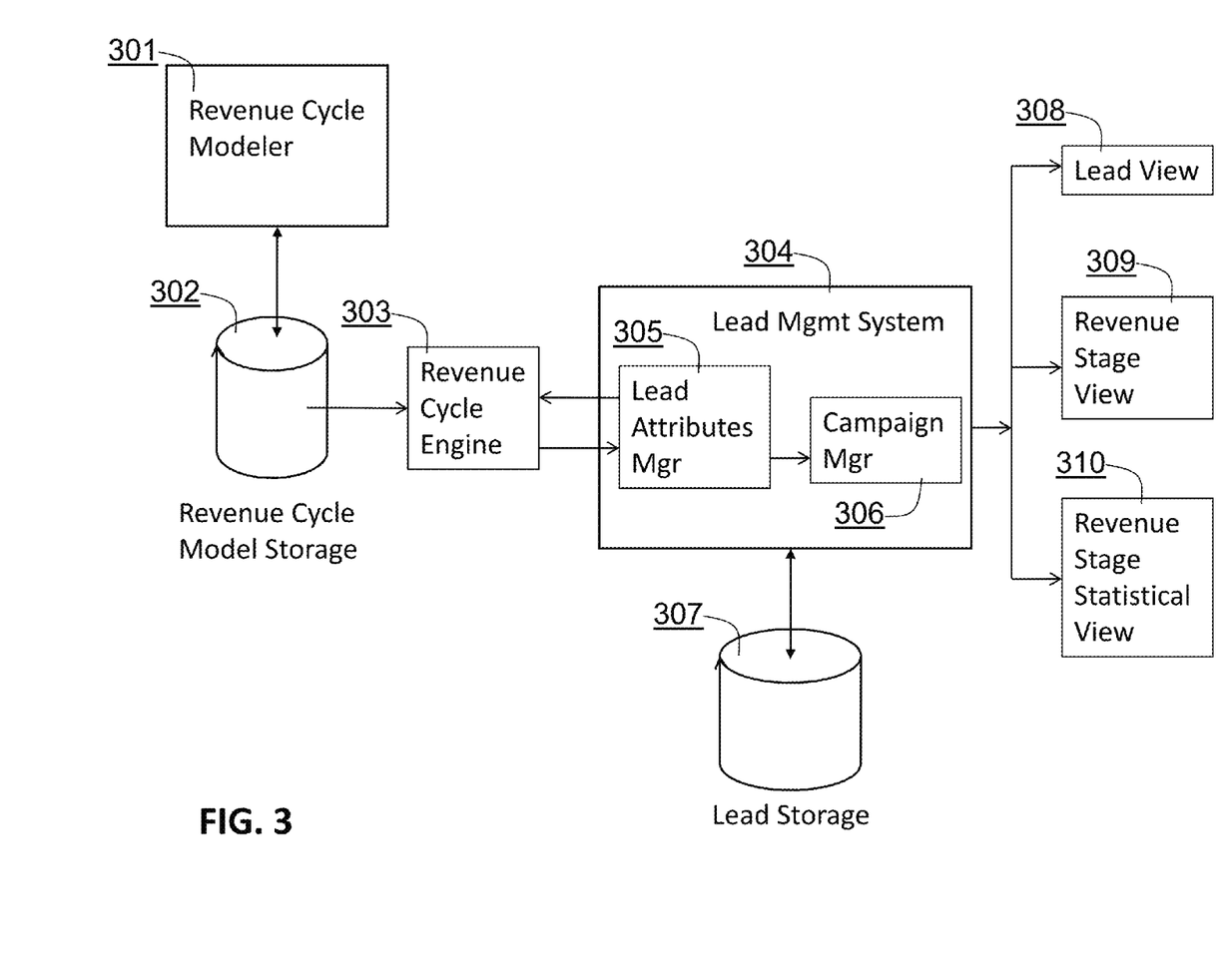
FIG. 3 illustrates an exemplary system architecture for use with the present system, according to one embodiment.

FIG. 3 illustrates an exemplary system architecture for use with the present system, according to one embodiment. A revenue cycle modeler 301 is a software module with a user interface. Users access the revenue cycle modeler 301 to define one or more revenue cycle models. Users can enter revenue stages, transitions, and transition rules for each revenue cycle model. In other embodiments, a revenue cycle modeler 301 is defined in a text file with a predefined format (e.g. XML) and therefore does not require a user interface.

A revenue cycle model can be in draft status or approved status, according to one embodiment. A model in approved status is published before it affects the movement of leads. A published model can be unpublished. Once unpublished, it can be modified and republished.

Revenue cycle models generated by the modeler 301 are stored into a storage system 302 and retrieved and used by a revenue cycle engine 303. The storage system is, according to one embodiment, a database but can be a file system in other embodiments.

According to one embodiment, a revenue cycle engine 303 is a software subsystem that comprises a revenue cycle model loader, a revenue cycle model interpreter, a revenue cycle manager, and lead attribute change listeners. The revenue cycle model loader loads from revenue cycle model storage 302 the revenue cycle models that are published. The revenue cycle model interpreter translates a revenue cycle model to a format such that a computer can move leads based on the revenue stages, transitions, and transition rules that are embodied in the revenue cycle model. A revenue cycle manager manages movement of leads based on revenue cycle triggers. Such triggers are initiated by a lead management system 304. The revenue cycle manager registers listeners to various triggers. Listeners define actions that will be taken by the revenue cycle manager when a trigger is detected. The revenue cycle manager manages a plurality of listeners.

The revenue cycle engine 303 interacts with a lead management system 304 that manages all the activities related to a lead. Activities related to the lead include activities that the lead performed (such as visit web page, attending webinar) as well as activities that the company and system performed on behalf of the lead (e.g., send an email to the lead, send an invitation, make a phone call).

According to one embodiment, the lead management system 304 supports a campaign manager 306 and a lead attributes manager 305 that informs the revenue cycle engine 303 of lead attribution changes. The lead attributes manager 305 also receives messages from the revenue cycle engine 303 to change a revenue stage for a lead.

It should be appreciated that the lead management system 304 and the revenue cycle engine 303 need not be separate subsystems.

According to one embodiment, a lead database 307 stores information related to a lead and its activities.

According to one embodiment, views are enabled that display revenue stage related information to end users, so that decisions can be made based on the information. Examples of view interfaces include Lead View 308, Revenue Stage View 309, and Revenue Stage Statistical View 310.

Figure 4:
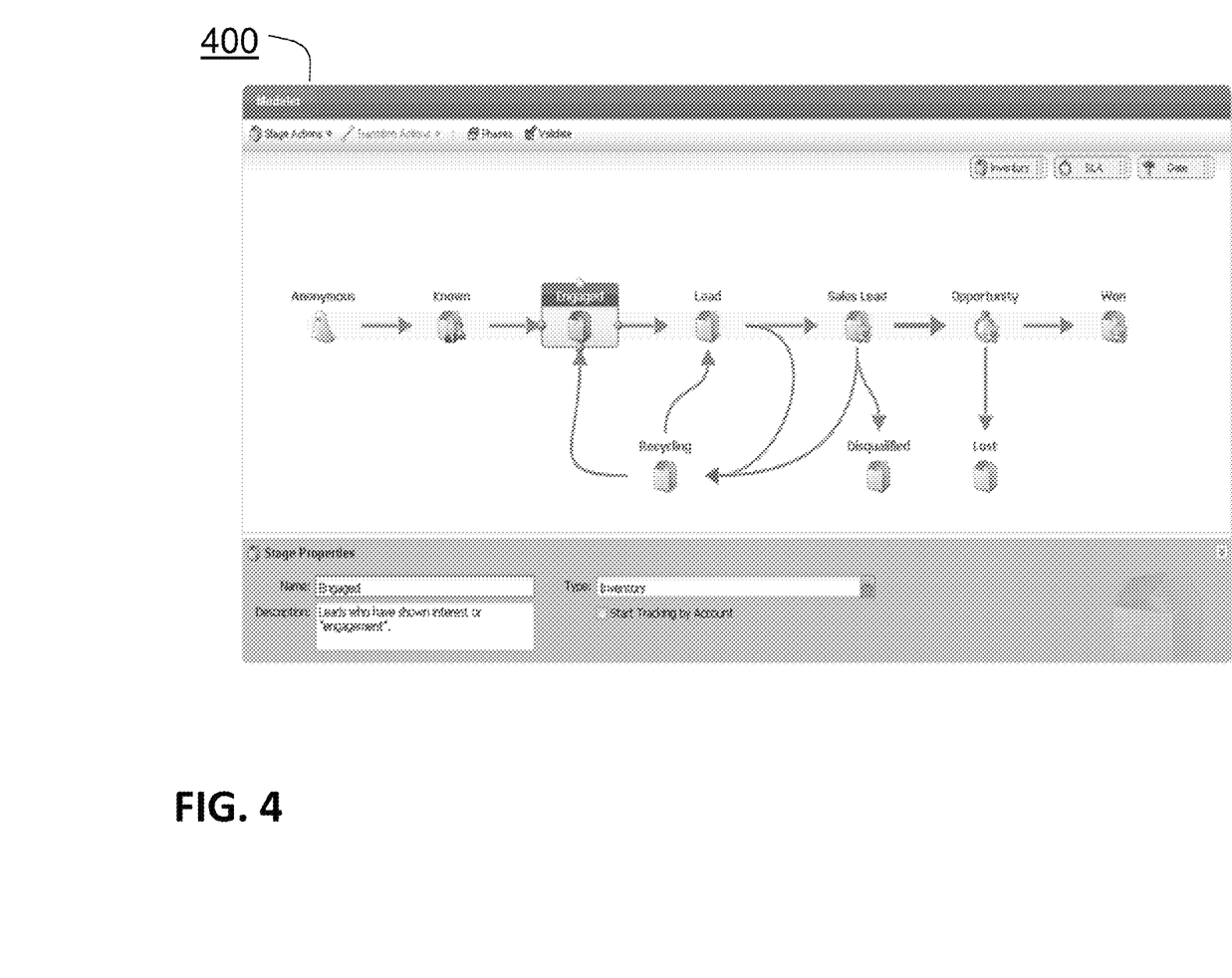
FIG. 4 illustrates an exemplary revenue cycle modeler for use with the present system, according to one embodiment.

FIG. 4 illustrates an exemplary revenue cycle modeler for use with the present system, according to one embodiment. A firm defines its custom revenue cycle model using the revenue cycle modeler interface 400.

According to one embodiment, defining a custom revenue cycle model, while referring to the exemplary interface 400, includes but is not limited to the following.

Create a Revenue Stage

A revenue stage is created by dragging one of multiple stage icons (examples labeled herein Inventory, SLA, or Gate) to create a stage with a given type.

Customize Properties of a Stage

Properties of a stage are modified by clicking on the stage (to select it), and then editing the properties values in the exemplary "Stage Properties" area.

Create a Transition

To create a transition (for example, from Engaged stage to Sales Lead stage), the user holds a mouse pointer over the exemplary small circle at the top of the Engaged stage, and drags it to "Sales Lead" area. Dragging stops when the targeted stage is highlighted.

Delete a Stage or Transition

A revenue stage or transition is deleted by right clicking on the stage or transition, and selecting to delete item in a context menu (not shown in this example).

Define SLA Stage

An SLA stage allows a user to define a maximum age. As an example, if the value is set to 7 a lead in the opportunity stage has to be followed up in 7 days.

Define Success Path

The success path in the example highlighted in FIG. 4 includes Anonymous, Known, Engaged, Lead, Sales Lead, Opportunity, and Won stages. The detour stages are Recycling, Disqualified and Lost in this example. Users can edit the numbers and types of stages on the success path of their own model.

Define/Edit Transition Rules

Edit transition rules for a transition is achieved by first selecting the transition and dragging a trigger or filter into view. The user can edit boolean logic to define the relationship (and, or) between different triggers and filters.

Assign Stages to Phases

Figure 9:
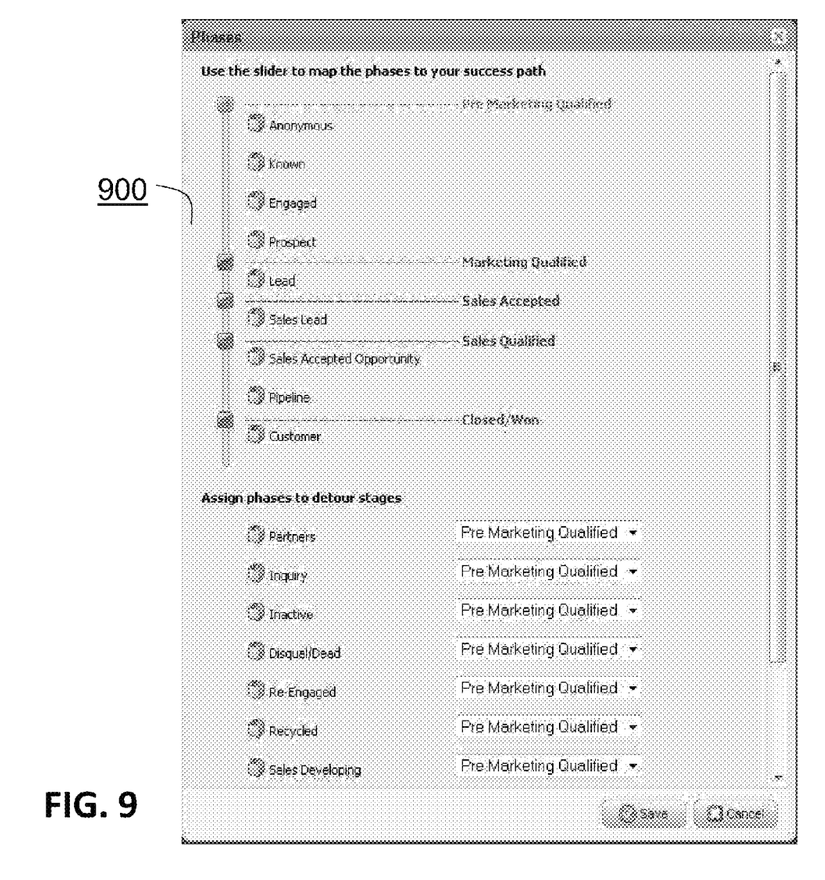
FIG. 9 illustrates an exemplary phase editor interface for use with the present system, according to one embodiment.

Users can assign stages to phases. An exemplary phase editor interface is illustrated in FIG. 9.

Pre-seed Success Path Stages

When a user creates a new revenue cycle model, success path stages can be pre-seeded. Users can edit the pre-seeded model to reflect their own marketing processes. The custombuilt revenue cycle model can have multiple success paths, different stages, various stage transitions and rules.

An exemplary transition properties area displays transition properties when a transition is clicked and kept in focus. In the given example 400, when the transition Known→Engaged is clicked, the transition rules can be interpreted as:

"A Known lead moves to Engaged by clicking a link in any e-mail or filling out any form or visiting the company web page at least 10 times in the last week."

Figure 5:
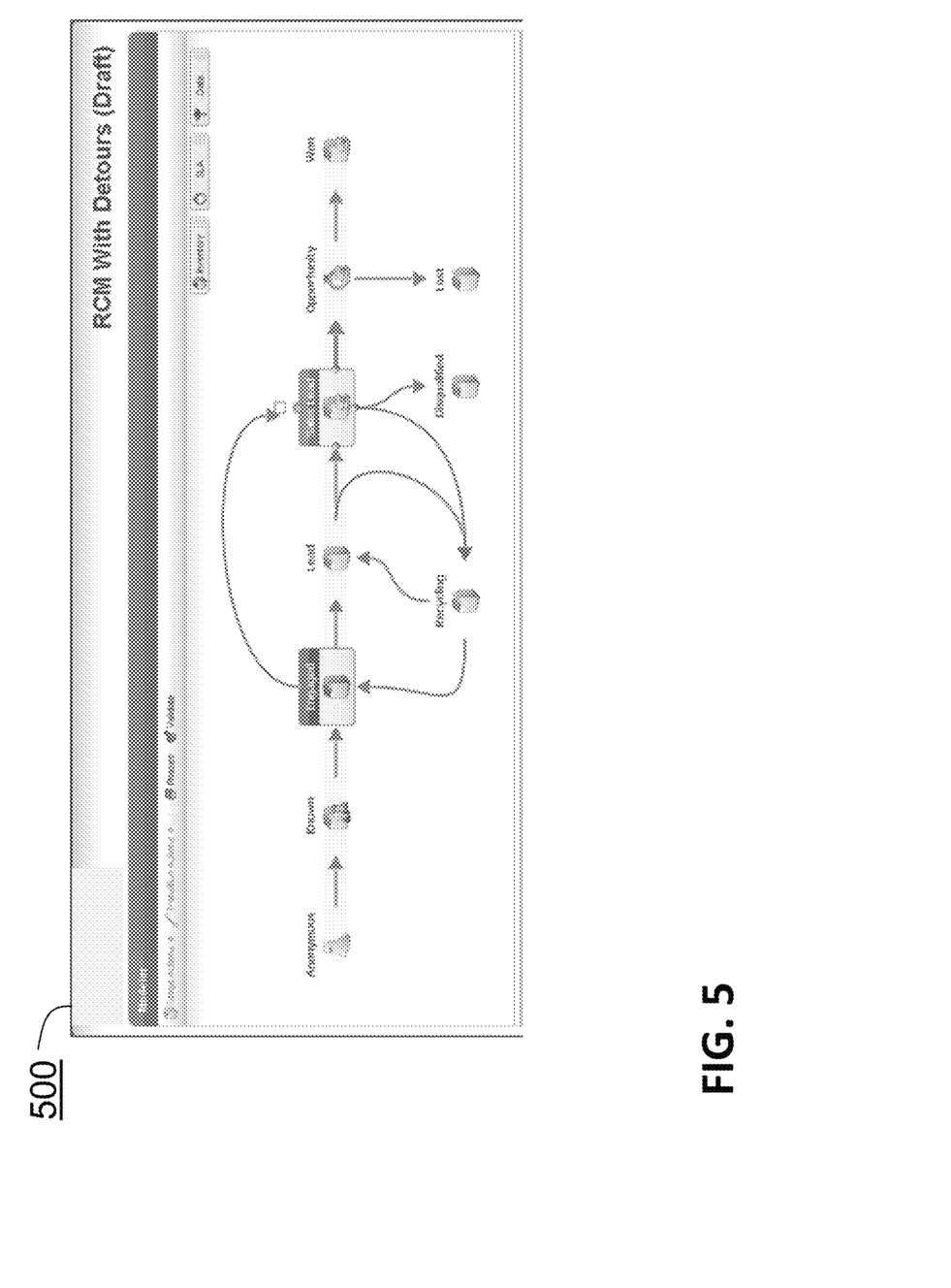
FIG. 5 illustrates an exemplary revenue cycle modeler with detours for use with the present system, according to one embodiment.

FIG. 5 illustrates another exemplary revenue cycle modeler with detours for use with the present system, according to one embodiment. The interface 500 includes a detour from the engaged to sale lead stages.

FIG. 6 illustrates an exemplary lead view interface for use with the present system, according to one embodiment. The interface 600 displays lead attributes and activities. In the example shown 600, a lead has a name "Jon Smith" and is from company Marketing.com. The interface 600 shows how this lead moves among various stages over time.

Figure 7:
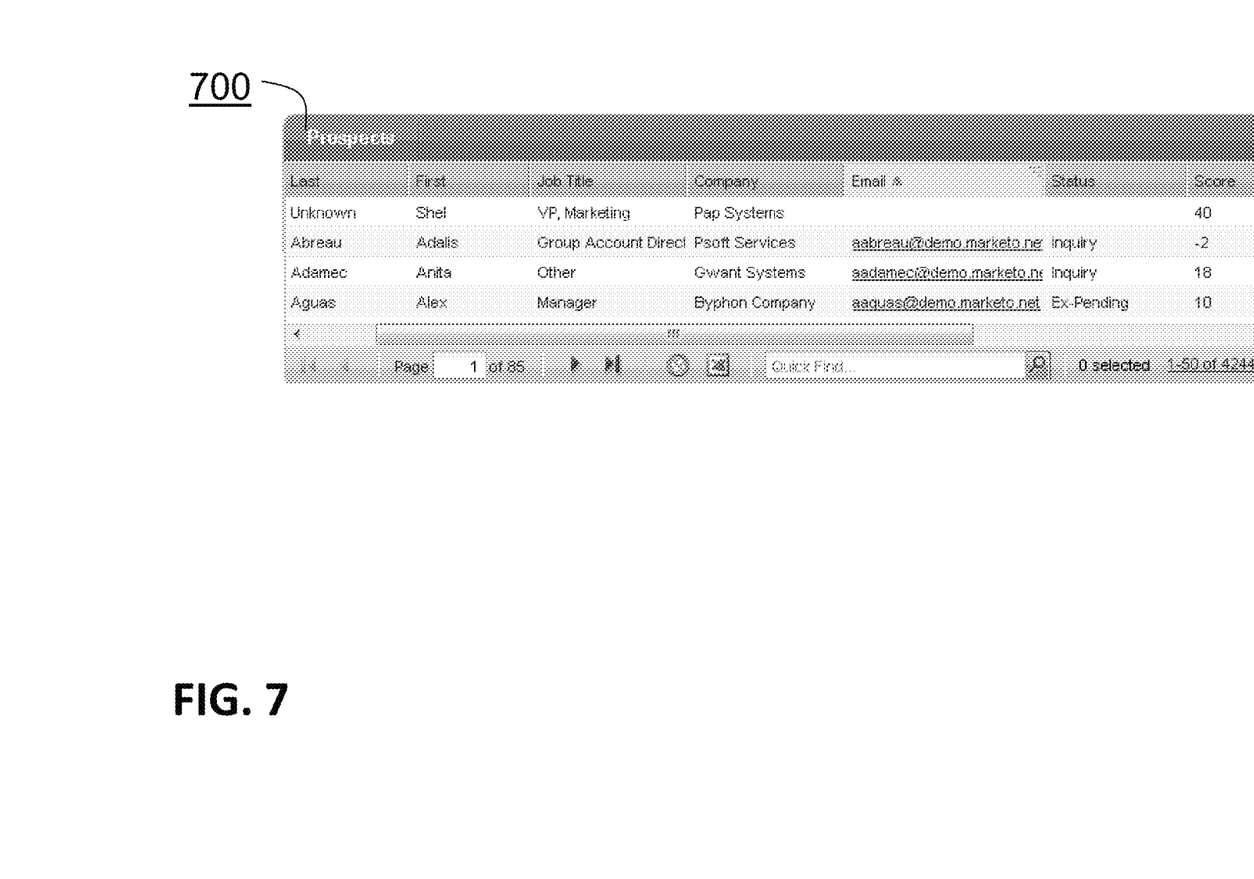
FIG. 7 illustrates an exemplary revenue stage view interface for use with the present system, according to one embodiment.

FIG. 7 illustrates an exemplary revenue stage view interface for use with the present system, according to one embodiment. The interface 700 displays all the leads in a specific stage (in this example 'Prospects'). In the bottom right corner of the exemplary interface 700, it can be seen that there are 4244 leads that are currently in prospects. A user navigates to each lead, choosing to send emails to these leads or to conduct other marketing activities.

Figure 8A:
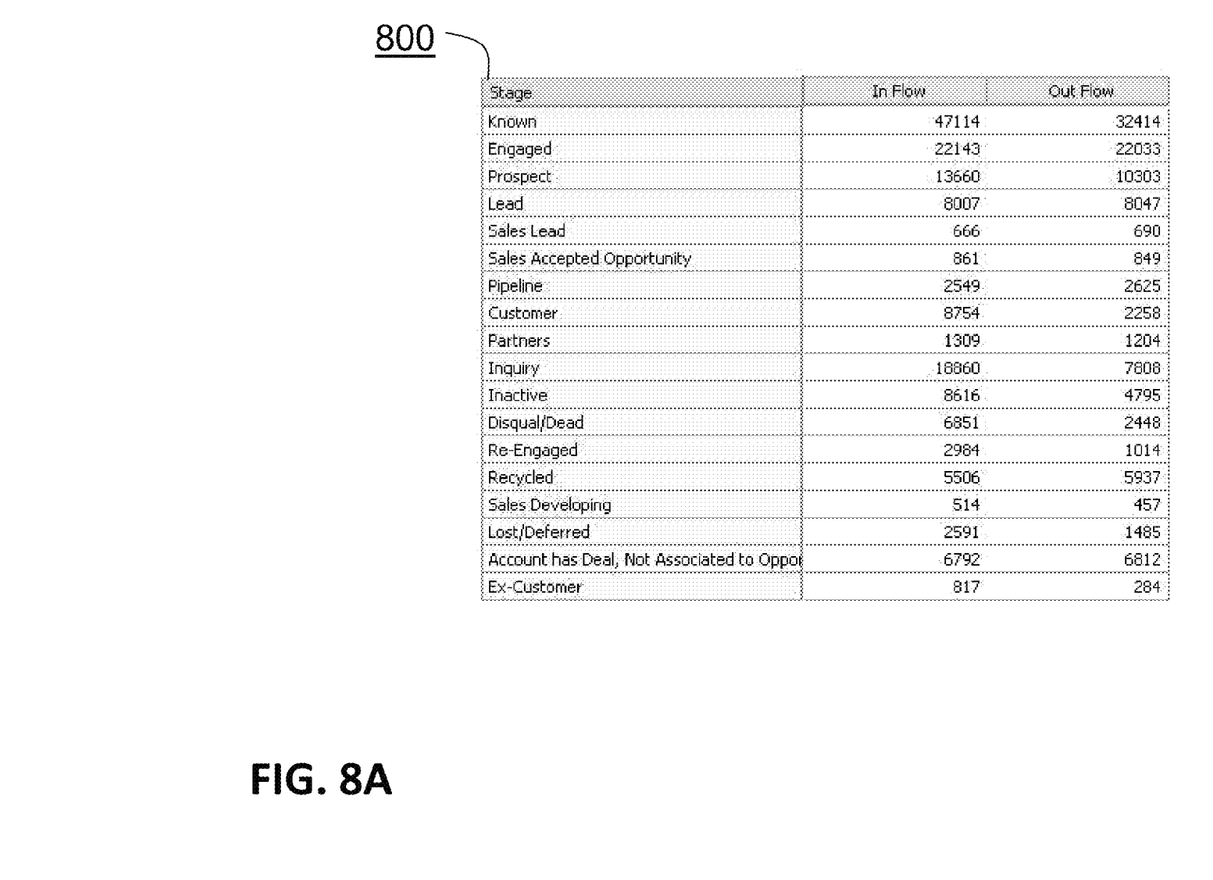
FIG. 8A illustrates an exemplary revenue stage statistical view interface for use with the present system, according to one embodiment.

FIG. 8A illustrates an exemplary revenue stage statistical view interface for use with the present system, according to one embodiment. The exemplary interface 800 displays the flow of leads among different stages. Once the revenue stage change activities are captured by the present system, statistics about lead movements (In Flow and Out Flow) among different stages are calculated. Such information provides valuable insight into the healthiness of lead pipeline. For example, in this interface 800, 47114 leads come in to the Known stage and only 32414 come out. This may suggest that the marketing department may be under-staffed to process the leads. On the other hand, in this example Sales Accepted Opportunity and Pipeline in flows and out flows are matching up well, suggesting that the sales pipeline is stable.

Figure 8B:
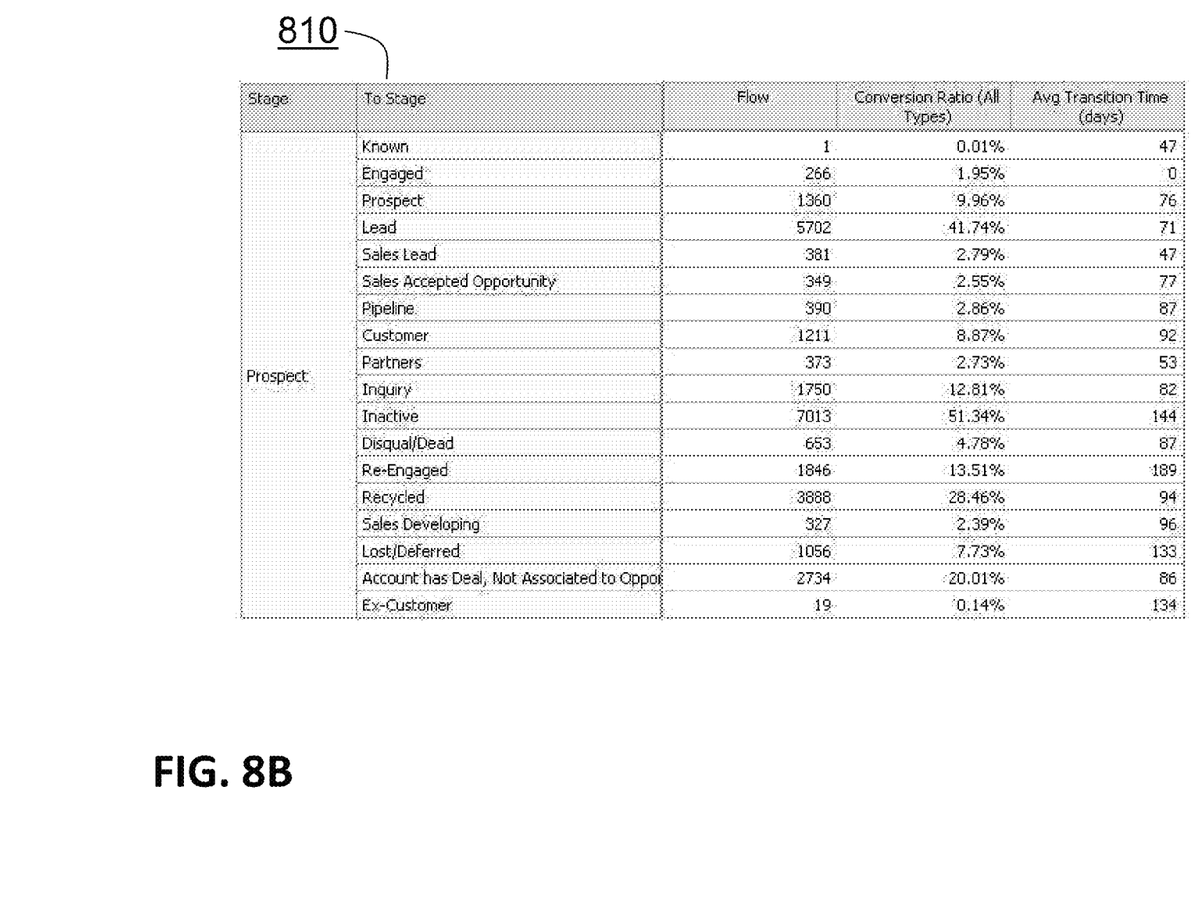
FIG. 8B illustrates another exemplary revenue stage statistical view interface for use with the present system, according to one embodiment.

FIG. 8B illustrates another exemplary revenue stage statistical view interface for use with the present system, according to one embodiment. The exemplary interface 810 displays transition count (flow) from the Prospect stage to all other stages, together with conversion ratios and average transition time. Customers derive valuable insights by looking at where leads go from a specific stage.

FIG. 9 illustrates an exemplary phase editor interface for use with the present system, according to one embodiment. An exemplary phase editor interface 900 enables a user to move sliders at the left to adjust where the phase boundaries are for stages on the success path. The user can also use a dropdown box to directly assign a stage not on the success path to a phase.

Figure 10:
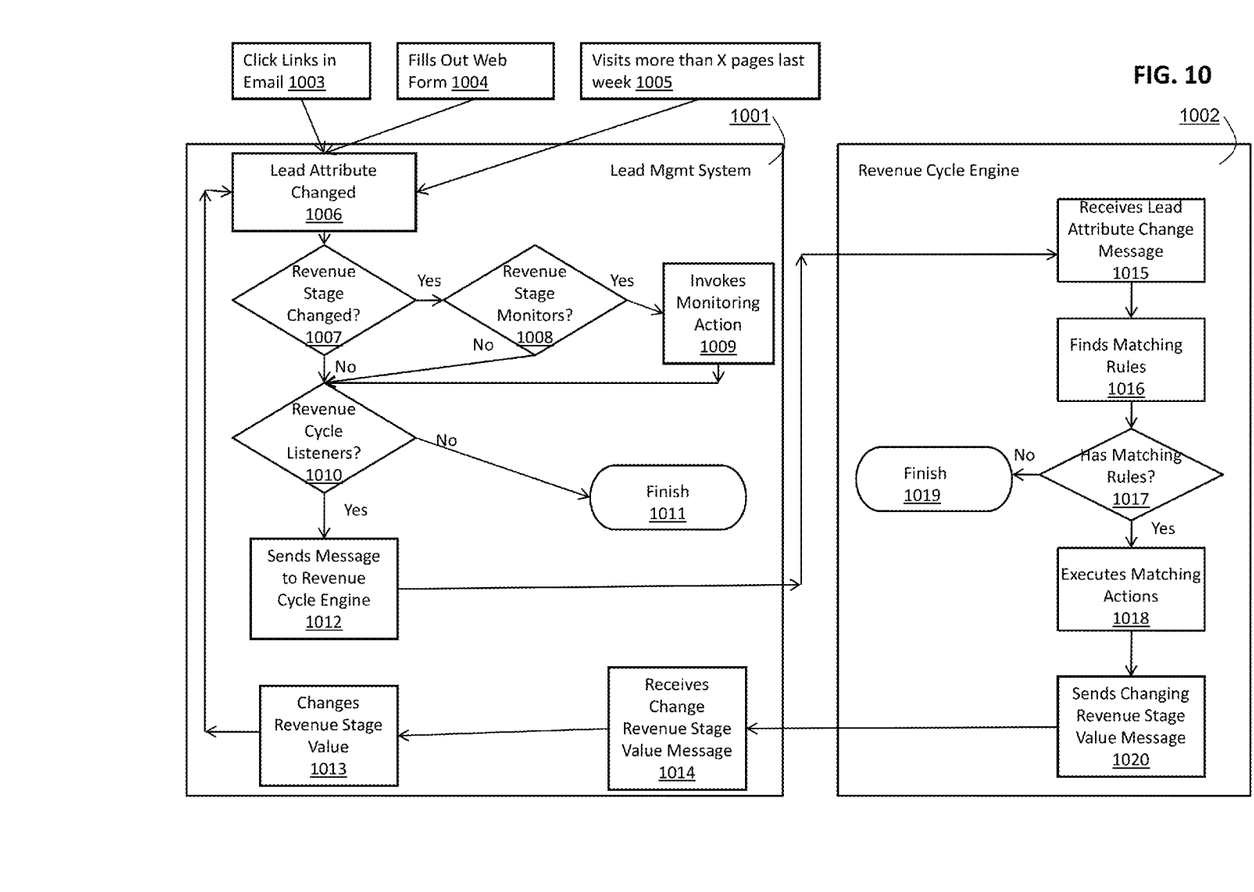
FIG. 10 illustrates an exemplary lead activity process for use with the present system, according to one embodiment.

FIG. 10 illustrates an exemplary lead activity process for use with the present system, according to one embodiment.

In the illustrated example, it is assumed that a revenue stage monitor is defined such that once a revenue stage is changed to Prospect, an email is sent to the lead to invite him/her to attend a webinar. It is also assumed that a transition rule is defined as: "A Known lead moves to Engaged by clicking a link in any e-mail (1003) or fills out any form (1004) or visits the company web page at least X times in the last week (1005)."

A user fills out a web form 1004, and a formFilled attribute of the lead is changed (from false to true) 1006. A lead management system 1001 checks whether the change is a revenue stage change 1007. In this example, it is not, so the system continues to check whether any revenue stage change listeners are registered 1010. In this example, there are, so the lead management system 1001 sends a message 1012 to a revenue cycle engine 1002 with information related to what attribute of which lead has changed, as well as the old value and the new value.

Once the revenue cycle engine 1002 receives the message 1002, it determines which rule matches the attribute change 1016. In some instances there are no matching rules (1017→1019). In this example, there is a transition rule that involves the change of formFilled from false to true (1017→1018). The revenue cycle engine 1002 executes the matching action for the rule 1018, which in this case is to change the revenue stage attribute of the lead from Known to Engaged. The revenue cycle engine 1002 then sends a message 1020 to change the revenue state back to the lead management system 1001.

The lead management system 1001 changes the revenue stage value for the lead 1013, in this example it is changed to Engaged. It should be appreciated that this is a lead attribute change, which triggers a lead attribute changed event 1006 again. This time, since the attribute change is a revenue stage change 1007, the revenue stage monitoring action 1008 is invoked 1009 first, which in this example means sending an invitation to webinar. The lead management system 1001 checks whether there is a revenue cycle listener 1010 registered for the stage changes. In this example there were none, so the processing finishes 1011.

Figure 11:
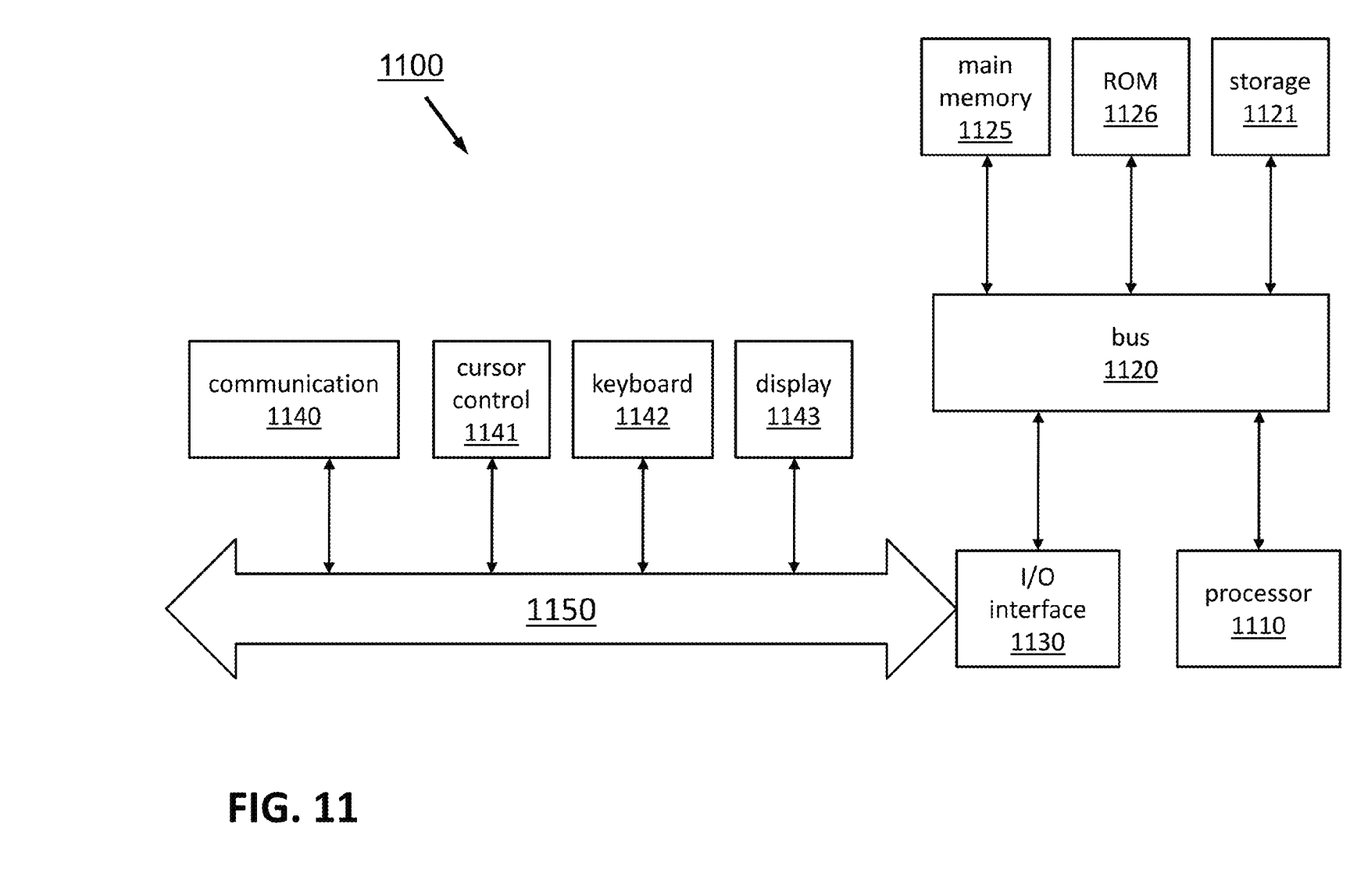
FIG. 11 illustrates an exemplary computer architecture that may be used for the present system, according to one embodiment.

FIG. 11 illustrates an exemplary computer architecture that may be used for the present system, according to one embodiment. One embodiment of architecture 1100 comprises a system bus 1120 for communicating information, and a processor 1110 coupled to bus 1120 for processing information. Architecture 1100 further comprises a random access memory (RAM) or other dynamic storage device 1125 (referred to herein as main memory), coupled to bus 1120 for storing information and instructions to be executed by processor 1110. Main memory 1125 also may be used for storing temporary variables or other intermediate information during execution of instructions by processor 1110. Architecture 1100 may also include a read only memory (ROM) and/or other static storage device 1126 coupled to bus 1120 for storing static information and instructions used by processor 1110.

A data storage device 1125 such as a magnetic disk or optical disc and its corresponding drive may also be coupled to architecture 1100 for storing information and instructions. Architecture 1100 can also be coupled to a second I/O bus 1150 via an I/O interface 1130. A plurality of I/O devices may be coupled to I/O bus 1150, including a display device 1143, an input device (e.g., an alphanumeric input device 1142 and/or a cursor control device 1141).

The communication device 1140 allows for access to other computers (e.g., servers or clients) via a network. The communication device 1140 may comprise one or more modems, network interface cards, wireless network interfaces or other interface devices, such as those used for coupling to Ethernet, token ring, or other types of networks.

Figure 12:
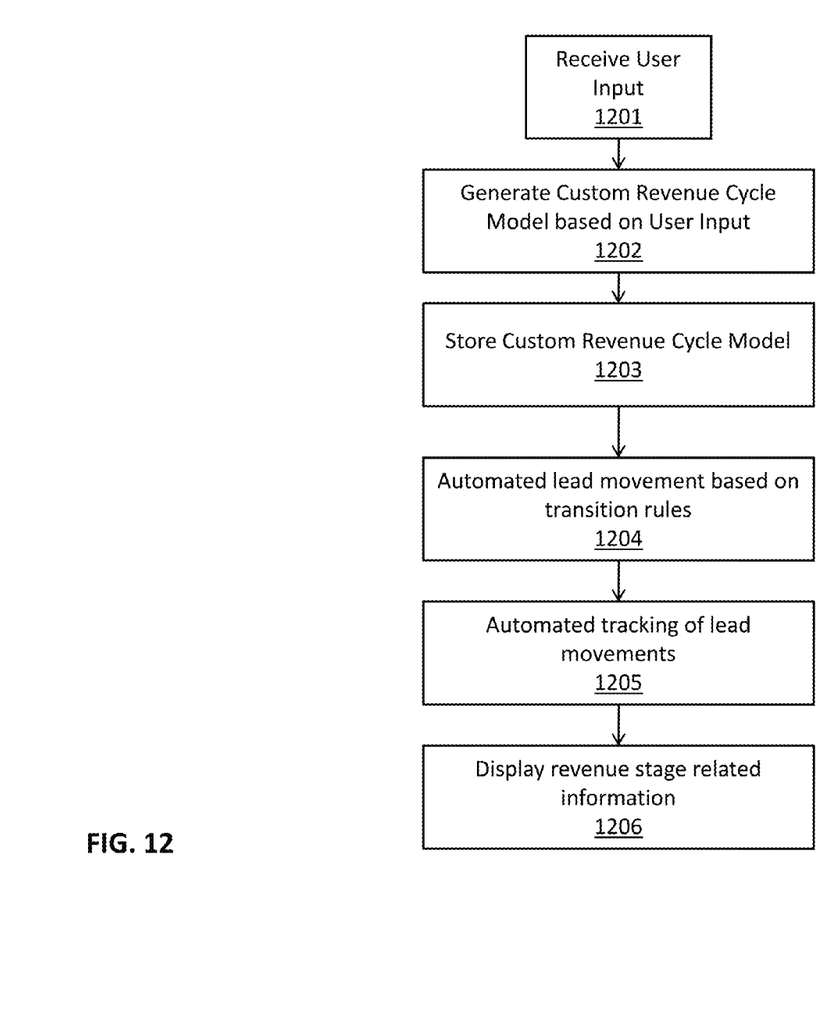
FIG. 12 illustrates an exemplary custom revenue cycle model generation process for use with the present system, according to one embodiment.

FIG. 12 illustrates an exemplary custom revenue cycle model generation process for use with the present system, according to one embodiment. User input is received 1201 and a custom revenue cycle model is generated based on the user input 1202. The custom revenue cycle model is stored 1203, and automated lead movements are provided for based on transition rules input by a user 1204. Automated tracking of lead movements is provided for 1205, and revenue stage related information can be displayed 1206.

In the description above, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description above. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

A system and method for generating a custom revenue cycle model with automated lead movement have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A system, comprising:
   a server in communication with a network and a database, and a software application stored on the server, the software application being executable by the server, and comprising computer instructions for:
   generating a custom revenue cycle model having a success path, the custom revenue cycle model including a plurality of stages and one or more transitions between different stages of the plurality of stages, wherein each of the plurality of stages is either a revenue stage or a detour stage, wherein the success path includes stages within the plurality of stages;
   receiving one or more transition rules from a user, where the received one or more transition rules define the one or more transitions between different stages of the plurality of stages, where each of the one or more transition rules controls movement of a lead along a corresponding transition from one stage to another stage within the custom revenue cycle model, wherein each of the one or more transition rules is defined by at least one trigger corresponding to one or more actions of the lead, wherein each of the one or more transition rules is mutually exclusive with respect to others of the one or more transition rules such that no more than one of the one or more transition rules controls movement of a given lead at a given time within the custom revenue cycle model;
   storing the custom revenue cycle model;
   observing one or more actions of one or more leads;
   generating, by an automated process, lead movements of the one or more leads between some of the plurality of stages by way of the one or more transitions based on the one or more transition rules, the lead movements generated by applying the one or more transition rules received from the user to the observed one or more actions of the one or more leads;
   tracking, by an automated process, the generated lead movements between different ones of the plurality of stages in the custom revenue cycle model; and
   generating a lead view interface for visual display on a display screen of a computing device, the lead view interface displaying the generated lead movements as tracked between different ones of the plurality of stages in the custom revenue cycle model.

2. The system of claim 1, wherein the server is further configured to perform:
   providing for display of revenue stage related information.

3. The system of claim 1, wherein the user input further comprises a definition of a revenue cycle phase.

4. The system of claim 1, wherein the success path is a desired pathway through the custom revenue cycle traversed by a lead.

5. The system of claim 1, wherein the revenue stage is one or more of known, engaged, prospect, lead, sales lead, sales accepted opportunity, pipeline, customer, partners, inquiry, inactive, disqual/dead, re-engaged, recycled, sales developing, lost/deferred, account has deal, ex-customer, or a custom stage defined by a user.

6. The system of claim 1, wherein the detour stage is not contained within the success path.

7. A computer-implemented method, comprising:
generating, by a processor, a custom revenue cycle model having a success path, the custom revenue cycle model including a plurality of stages and one or more transitions between different stages of the plurality of stages, wherein each of the plurality of stages is either a revenue stage or a detour stage, wherein the success path includes stages within the plurality of stages;
receiving one or more transition rules from a user, where the received one or more transition rules define the one or more transitions between different stages of the plurality of stages, where each of the one or more transition rules controls movement of a lead along a corresponding transition from one stage to another stage within the custom revenue cycle model, wherein each of the one or more transition rules is defined by at least one trigger corresponding to one or more actions of the lead, wherein each of the one or more transition rules is mutually exclusive with respect to others of the one or more transition rules such that no more than one of the one or more transition rules controls movement of a given lead at a given time within the custom revenue cycle model;
storing the custom revenue cycle model;
observing one or more actions of one or more leads;
generating, by an automated process, lead movements of the one or more leads between some of the plurality of stages by way of the one or more transitions based on the one or more transition rules, the lead movements generated by applying the one or more transition rules received from the user to the observed one or more actions of the one or more leads;
tracking, by an automated process, the generated lead movements between different ones of the plurality of stages in the custom revenue cycle model; and
generating a lead view interface for visual display on a display screen of a computing device, the lead view interface displaying the generated lead movements as tracked between different ones of the plurality of stages in the custom revenue cycle model.

8. The computer-implemented method of claim 7, further comprising:
providing for display of revenue stage related information.

9. The computer-implemented method of claim 7, wherein the user input further comprises a definition of a revenue cycle phase.

10. The computer-implemented method of claim 7, wherein the success path is a desired pathway through the custom revenue cycle traversed by a lead.

11. The computer-implemented method of claim 7, wherein the revenue stage is one or more of known, engaged, prospect, lead, sales lead, sales accepted opportunity, pipeline, customer, partners, inquiry, inactive, disqual/dead, re-engaged, recycled, sales developing, lost/deferred, account has deal, ex-customer, or a custom stage defined by a user.

12. The computer-implemented method of claim 7, wherein the detour stage is not contained within the success path.

13. A non-transitory computer-readable medium having stored thereon a plurality of instructions, the instructions when executed by a processor cause the processor to perform:
generating a custom revenue cycle model having a success path, the custom revenue cycle model including a plurality of stages and one or more transitions between different stages of the plurality of stages, wherein each of the plurality of stages is either a revenue stage or a detour stage, wherein the success path includes stages within the plurality of stages;
receiving one or more transition rules from a user, where the received one or more transition rules define the one or more transitions between different stages of the plurality of stages, where each of the one or more transition rules controls movement of a lead along a corresponding transition from one stage to another stage within the custom revenue cycle model, wherein each of the one or more transition rules is defined by at least one trigger corresponding to one or more actions of the lead, wherein each of the one or more transition rules is mutually exclusive with respect to others of the one or more transition rules such that no more than one of the one or more transition rules controls movement of a given lead at a given time within the custom revenue cycle model;
storing the custom revenue cycle model;
observing one or more actions of one or more leads;
generating, by an automated process, lead movements of the one or more leads between some of the plurality of stages by way of the one or more transitions based on the one or more transition rules, the lead movements generated by applying the one or more transition rules received from the user to the observed one or more actions of the one or more leads;
tracking, by an automated process, the generated lead movements between different ones of the plurality of stages in the custom revenue cycle model; and
generating a lead view interface for visual display on a display screen of a computing device, the lead view interface displaying the generated lead movements as tracked between different ones of the plurality of stages in the custom revenue cycle model.

14. The computer-readable medium of claim 13, wherein the instructions further cause the processor to perform:
providing for display of revenue stage related information.

15. The computer-readable medium of claim 13, wherein the user input further comprises a definition of a revenue cycle phase.

16. The computer-readable medium of claim 13, wherein the success path is a pathway through the custom revenue cycle traversed by a lead.

17. The computer-readable medium of claim 13, wherein the revenue stage is one or more of known, engaged, prospect, lead, sales lead, sales accepted opportunity, pipeline, customer, partners, inquiry, inactive, disqual/dead, re-engaged, recycled, sales developing, lost/deferred, account has deal, ex-customer, or a custom stage defined by a user.

18. The computer-readable medium of claim 13, wherein the detour stage is not contained within the success path.

* * * * *